United States Patent [19]
Singh et al.

[11] Patent Number: 5,371,494
[45] Date of Patent: Dec. 6, 1994

[54] METHOD FOR OPTIMIZING THE TRANSMISSION OF AUTHORIZATION OF ACCESS TO A NETWORK COMPRISING OPEN CHANNELS

[75] Inventors: Saini J. Singh, Rosenwiller; Pierre Troian, Hoenheim, both of France

[73] Assignee: Laboratoire Europeen de Recherches Electroniques Avancees, Courbevoie, France

[21] Appl. No.: 225,917

[22] Filed: Apr. 11, 1994

Related U.S. Application Data

[63] Continuation of Ser. No. 974,822, Nov. 16, 1992, abandoned, which is a continuation of Ser. No. 555,515, Aug. 15, 1990, abandoned.

[30] Foreign Application Priority Data

Dec. 15, 1988 [FR] France ................... 88 16552

[51] Int. Cl.$^5$ ............... H04Q 1/40; G05B 23/02; H04J 3/17
[52] U.S. Cl. ............... 340/825.5; 340/825.06; 370/85.3
[58] Field of Search ........... 340/825.5, 825.06, 825.51; 370/85.3, 85.7, 85.6

[56] References Cited

U.S. PATENT DOCUMENTS

| | | | |
|---|---|---|---|
| 4,332,027 | 5/1982 | Malcolm et al. | 370/85.3 |
| 4,608,559 | 8/1986 | Friedman et al. | 340/825.5 |
| 4,773,003 | 9/1988 | Hauge | 364/DIG. 1 |
| 5,040,175 | 8/1991 | Tuch et al. | 370/85.3 |
| 5,115,233 | 5/1992 | Zdunek et al. | 340/825.5 |

FOREIGN PATENT DOCUMENTS 0088906 9/1983 European Pat. Off. .

OTHER PUBLICATIONS

Research Disclosure, May 1988, No. 289, Dutch PTT Administration, Intellectual Property Group (Anonymous Author), pp. 267–268.

*Primary Examiner*—Donald J. Yusko
*Assistant Examiner*—Mark H. Rinehart
*Attorney, Agent, or Firm*—Oblon, Spivak, McClelland, Maier & Neustadt

[57] ABSTRACT

In a network in which conflicts may arise because of simultaneous requests from several interlocutors, the invention provides for immediate granting of access to the network to a caller if, in a specified period of time prior to the request from the caller, no other request has been transmitted. If not, the controller of the network monitors the occupation of the network and, once it is no longer occupied, it verifies that no other request has been transmitted for a randomly specified period of time. If it is the case, it sends a verification message to the caller and, if it receives an acknowledgement of reception before a specified time, it grants him access to the network.

2 Claims, 2 Drawing Sheets

METHOD FOR OPTIMIZING THE TRANSMISSION OF AUTHORIZATION OF ACCESS TO A NETWORK COMPRISING OPEN CHANNELS

This application is a continuation of application Ser. No. 07/974,822, filed on Nov. 16, 1992, now abandoned, which is continuation of application Ser. No. 07/555,515, filed on Aug. 15, 1990, now abandoned.

BACKGROUND OF THE INVENTION

1. Field of the Invention

The present invention relates to a method for optimizing the transmission of authorization of access to a network comprising open channels.

2. Discussion of Background

In a transmission network comprising open channels, that is to say channels to which interlocutors not belonging to the network (high frequency transmission channels for example) may have access, it may happen that several interlocutors simultaneously request access to this network, which provokes conflicts. Such conflicts are particularly troublesome for the operation of the network when numerous interlocutors simultaneously transmit their access requests.

The subject of the present invention is a method enabling the access to a network of the abovementioned type to be authorized in optimal fashion in particular when numerous interlocutors demand it.

SUMMARY OF THE INVENTION

The method of the invention consists in enabling access to a channel of the network to a caller having a message to send on this channel if no activity has shown up on this channel for a specified period of time prior to the request from this caller, else in monitoring the occupation of the channel and, once it is no longer occupied, in verifying for a period of time of randomly specified duration, the arrival of another message, in returning to the step for monitoring occupation of the channel of the network if during this period of time another message circulates on this channel and, in the contrary case, in enabling the access of the channel to the caller at the end of the said period of time of randomly specified duration.

According to an advantageous characteristic of the invention, after the dispatch of the message the device for controlling the caller's access to the network awaits for a specified period of time an acknowledgement of reception from the addressee of the message, puts an end to the transmission procedure if the correct acknowledgement of reception reaches it before the expiration of this period of time, else the control device triggers a temporization of randomly specified duration, if the channel is occupied on the expiry of this temporization it returns to the step for monitoring occupation of the channel of the network, else it sends the message again.

BRIEF DESCRIPTION OF THE DRAWINGS

The present invention will be better understood on reading the detailed description of an embodiment, taken by way of non-limiting example and illustrated by the attached drawing in which the single figure is a flow diagram of the method of the invention.

DETAILED DESCRIPTION OF THE PREFERRED EMBODIMENTS

Figure 1A:
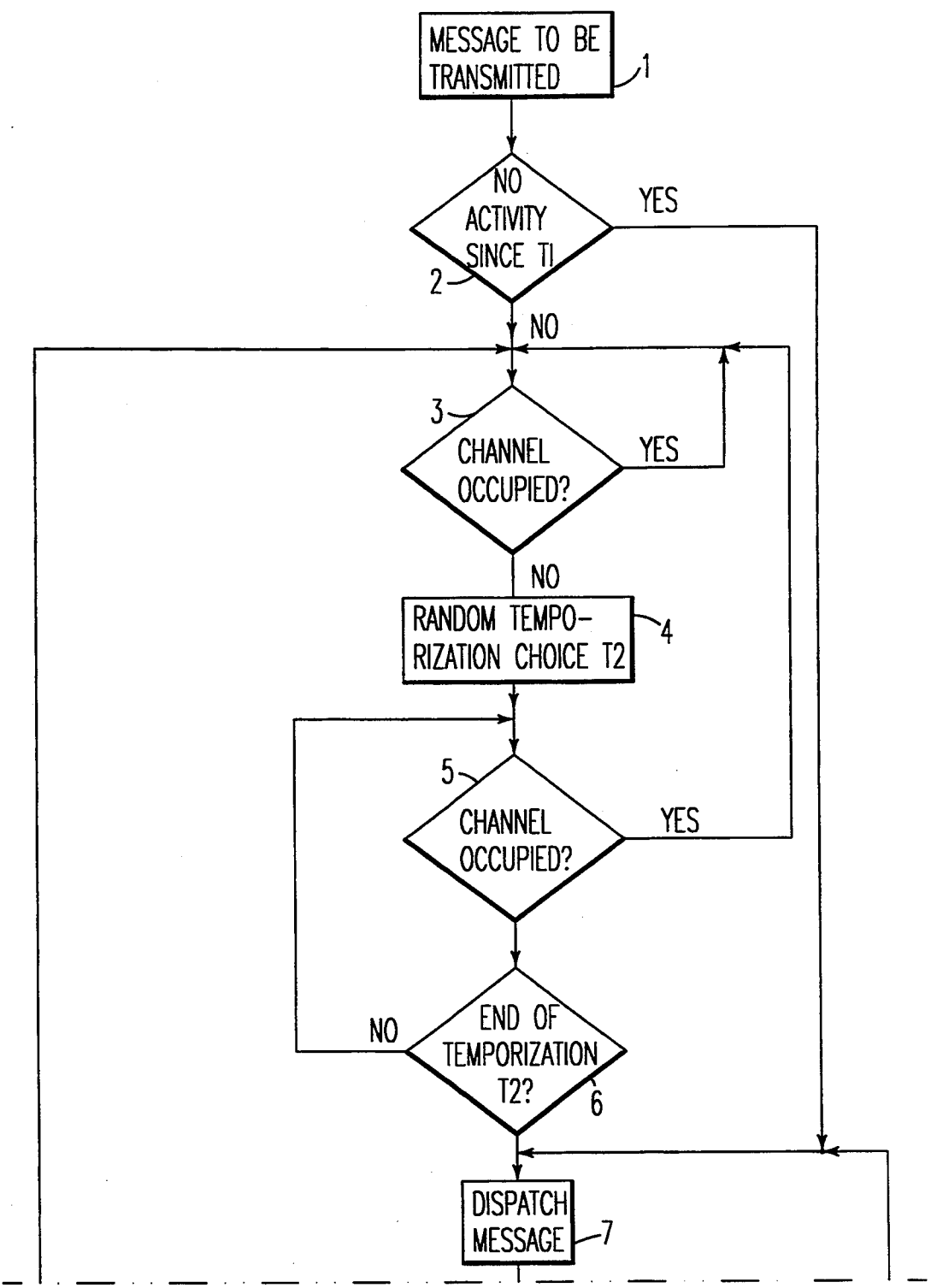
Figure 1B:
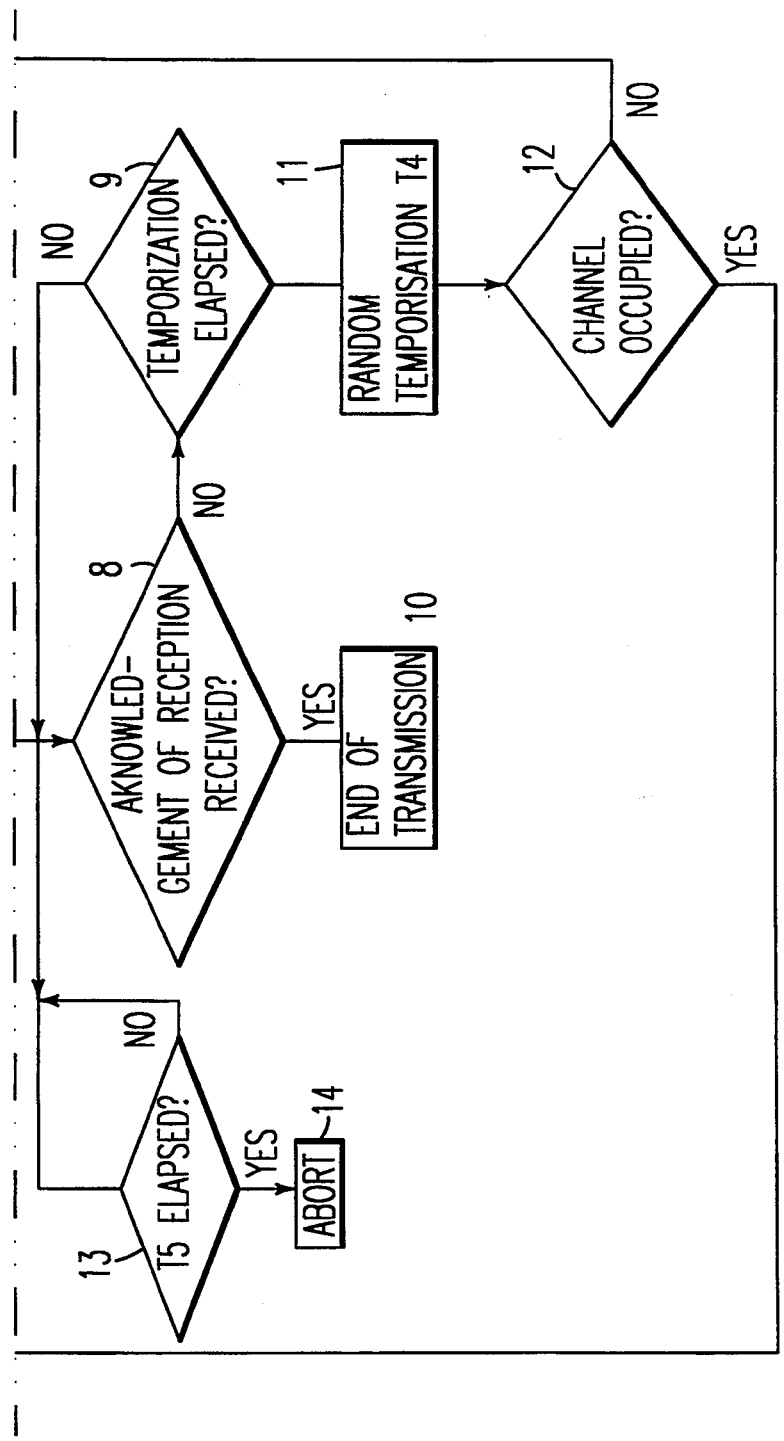

The invention is explained hereinunder by reference to a home-automation network comprising several different transmission channels: "closed" channels, such as pairs of stranded wires, coaxial cables, etc . . . and at least one "open" channel, that is to say a channel which can be picked up by items of equipment other than those belonging to this network. A typical example of such an open channel is a high frequency radio link. However, it is of course understood that the invention is not limited to such a network and may be applied to other types of networks in which conflicts may arise due to simultaneous access requests from several different callers and even to networks without open channels.

It is assumed that at an instant t1 a caller D wishes to send a message on a channel of a network (1). The device for controlling access of the caller to the network verifies that no activity has taken place on this channel for a period of time T1 (2) prior to the instant t1. The period of time T1 is, for example, around 125 ms. So long as this channel is occupied (3) the control device does not proceed to other steps. Once the channel is no longer occupied the control device triggers a temporization T2 of randomly chosen duration (4). This duration is, for example, comprised between 80 and 150 ms roughly. For the duration of the temporization T2 the control device verifies whether a message is circulating on the channel (5). If yes, it returns to the step 3. If no, it awaits (6) the end of the said temporization of randomly chosen duration. If no message is present on the channel during this temporization the device for control of the caller D enables him to send a message (7).

If for the period of time T1 preceding the instant t1 no message has circulated on the channel of the network (2), the control device immediately passes to the message dispatch step.

Immediately after the transmission of the message the control device places itself in listening mode on standby for an acknowledgement of reception (8). If this acknowledgement of reception arrives at the control device before the expiry of a time T3 (9), it terminates the transmission procedure (10). In the contrary case, or if the acknowledgement of reception is incorrect, the control device triggers a temporization T4 of randomly chosen duration (11). The duration of T4 is, for example, comprised between 10 and 40 ms roughly. On expiry of T4, the control device verifies whether the channel is occupied (12). If yes, it returns to the step 3. If no, it sends a message again (7).

So as not to halt the network for too long, according to an advantageous characteristic of the invention, another temporization T5 is triggered (13) from the start of the transmission of a message. If the device for controlling the caller has not recognized correct acknowledgement of reception at the end of the time T5, the attempt to transmit the message is aborted (14). In this case, there may occur either an automatic restart of the whole of the procedure described hereinabove (from the step 1) or, triggering off an alarm or, a final stoppage of this attempt.

We claim:

1. A method for optimizing the access to a network of communication channels comprising the steps of:
  enabling access to a channel of the network to a caller making a request for sending a message on said channel if no activity has occurred on said channel for a first specified period of time prior to said request from said caller; and if an activity has occurred during said first specified period of time, monitoring occupation of said channel until said channel is no longer occupied including the step of verifying, for a second period of time of random specified duration, the the occupation of said channel and returning to said step of monitoring of occupation of said channel when during said second period of time said channel is occupied and, if said channel is not occupied, enabling the access of said channel to said caller at the end of said second period of time of random specified duration.

2. The method according to claim 1 wherein when the message from said caller has been sent the method further involves the step of waiting for a third specified period of time for an acknowledgement of reception of said message and terminating the transmission if a correct acknowledgement of reception is received before the expiration of said third specified period of time and if the correct acknowledgement of reception is not received before the expiration of said third period of time, the method involves triggering a fourth period of randomly specified duration and if said channel is occupied at the end of said fourth period of randomly specified duration returning to the step for monitoring occupation of said channel of said network and if said channel is not occupied on the expiration of said fourth period of randomly specified duration said message is again sent.

* * * * *

UNITED STATES PATENT AND TRADEMARK OFFICE
CERTIFICATE OF CORRECTION

PATENT NO. : 5,371,494
DATED : December 6, 1994
INVENTOR(S) : Jasjit SAINI, et al.

It is certified that error appears in the above-indentified patent and that said Letters Patent is hereby corrected as shown below:

On the title page, Items[19] and [75], the first inventor's name is listed incorrectly. It should read:

[19] --Saini et al.--

[75] --Jasjit S. Saini--

In the Related U.S. Application Data, Item [63], line 3 and Column 1, line 10, after abandoned please insert:

--, which was filed as PCT/FR89/00646, Dec. 12, 1989.--

Signed and Sealed this

Fourth Day of April, 1995

*Attest:*

BRUCE LEHMAN

*Attesting Officer*    Commissioner of Patents and Trademarks